United States Patent [19]

Andersen et al.

[11] Patent Number: 5,685,772
[45] Date of Patent: Nov. 11, 1997

[54] ACOUSTIC VOLUME AND TORQUE WEIGHT SENSOR

[75] Inventors: David P. Andersen, Burnsville; Michael Farmer, Eagan, both of Minn.

[73] Assignee: Lockheed Martin Corporation, Bethesda, Md.

[21] Appl. No.: 336,338

[22] Filed: Nov. 9, 1994

[51] Int. Cl.$^6$ .................................................. A01F 12/50
[52] U.S. Cl. ........................... 460/6; 460/7; 56/10.2 R
[58] Field of Search ........................... 460/4, 5, 6, 7, 460/150, 149; 56/10.2 R, 10.2 A, 10.2 B, 10.2 C, DIG. 15

[56] References Cited

U.S. PATENT DOCUMENTS

| | | | |
|---|---|---|---|
| 3,594,504 | 7/1971 | Munson | 179/1 N |
| 4,502,121 | 2/1985 | Clavier et al. | 364/422 |
| 4,724,385 | 2/1988 | Vail, III | 324/303 |
| 4,862,892 | 9/1989 | Green | 128/660.07 |
| 5,065,763 | 11/1991 | Green et al. | 128/660.07 |
| 5,318,475 | 6/1994 | Schrock et al. | 460/6 X |
| 5,327,708 | 7/1994 | Gerrish | 460/7 X |
| 5,480,354 | 1/1996 | Sadjadi | 460/7 |
| 5,518,454 | 5/1996 | Twilley et al. | 460/7 |

Primary Examiner—Terry Lee Melius
Attorney, Agent, or Firm—Carl L. Johnson; Glenn W. Bowen

[57] ABSTRACT

A device to measure the volume and weight of a harvested grain crop during the harvesting of the grain crop with a weight measurement member including an elevator for moving grain from a lower elevation to a higher elevation with the elevator having a rotatable belt and a set of paddles thereon for moving grain from the lower elevation to the higher elevation with a torque sensor to determine the increase in torque on the shaft as a result of having to raise the kernels of grain from the lower elevation to the higher elevation and an acoustic volume measurement member to obtain information on the depth of the grain that is correlatable to volume of the harvested crop.

5 Claims, 2 Drawing Sheets

ACOUSTIC VOLUME AND TORQUE WEIGHT SENSOR

FIELD OF THE INVENTION

This invention relates to yield measurements of crops and, more specifically, to on-the-go yield measurement of crops as the crop is being harvested.

BACKGROUND OF THE INVENTION

One of the important measurements a farmer makes is the yield measurement of his or her crops. Farmers' profits relate directly to yield, so the earlier a farmer obtains yield-related information the sooner he or she possesses the information the better the farmer can evaluate the factors which affect yield.

Various methods of using radio-frequency (RF) measurement techniques to monitor the yield of farm grain crops have been considered. The method of monitoring the yield using RF is preferable to many other methods because it is a non-contacting, non-destructive and non-contaminating method which has no mechanical moving parts and uses human-safe RF levels (i.e., levels similar to portable radio transmitters, cellular phones, etc.)

Another method uses impact plates that correlate the deflection of the plate to the yield of the crop.

Typically, yields are expressed in bushels per acre. Possession of on-the-go yield measurements of a crop during harvesting enables a farmer to evaluate the current crop and immediately determine the localized effect of various factors, such as soil or wind damage, on crop yield.

DESCRIPTION OF THE PRIOR ART

U.S. Pat. No. 5,065,763 shows an ultrasonic imaging device for producing a higher quality image.

U.S. Pat. No. 4,724,385 shows an acoustic logging tool for remote volumetric measurements.

U.S. Pat. No. 4,502,121 shows the use of electrical signal to determine the located of hydrocarbon deposits within the earth.

U.S. Pat. No. 3,594,504 shows a digital volume indicator for measuring the level of speech.

SUMMARY OF THE INVENTION

Briefly, the invention comprises a system to enable one to determine the weight and volume of the crop as the crop is being harvested and then coupling the information with the area of grain cut to determine the yield on a per acre basis. The volume monitor uses an acoustic sensor to measure the volume of grain that is being elevated from one elevation to a higher elevation and the weight monitor is a torque sensor to determine the weight of the volume of grain that is being elevated from one elevation to another higher elevation. Combining information on the position or speed of the harvesting unit as well as on the swath width of the harvested crop enables one to accurately determine the yield of the harvested crop on-the-go.

DESCRIPTION OF THE PREFERRED EMBODIMENT

Figure 1:
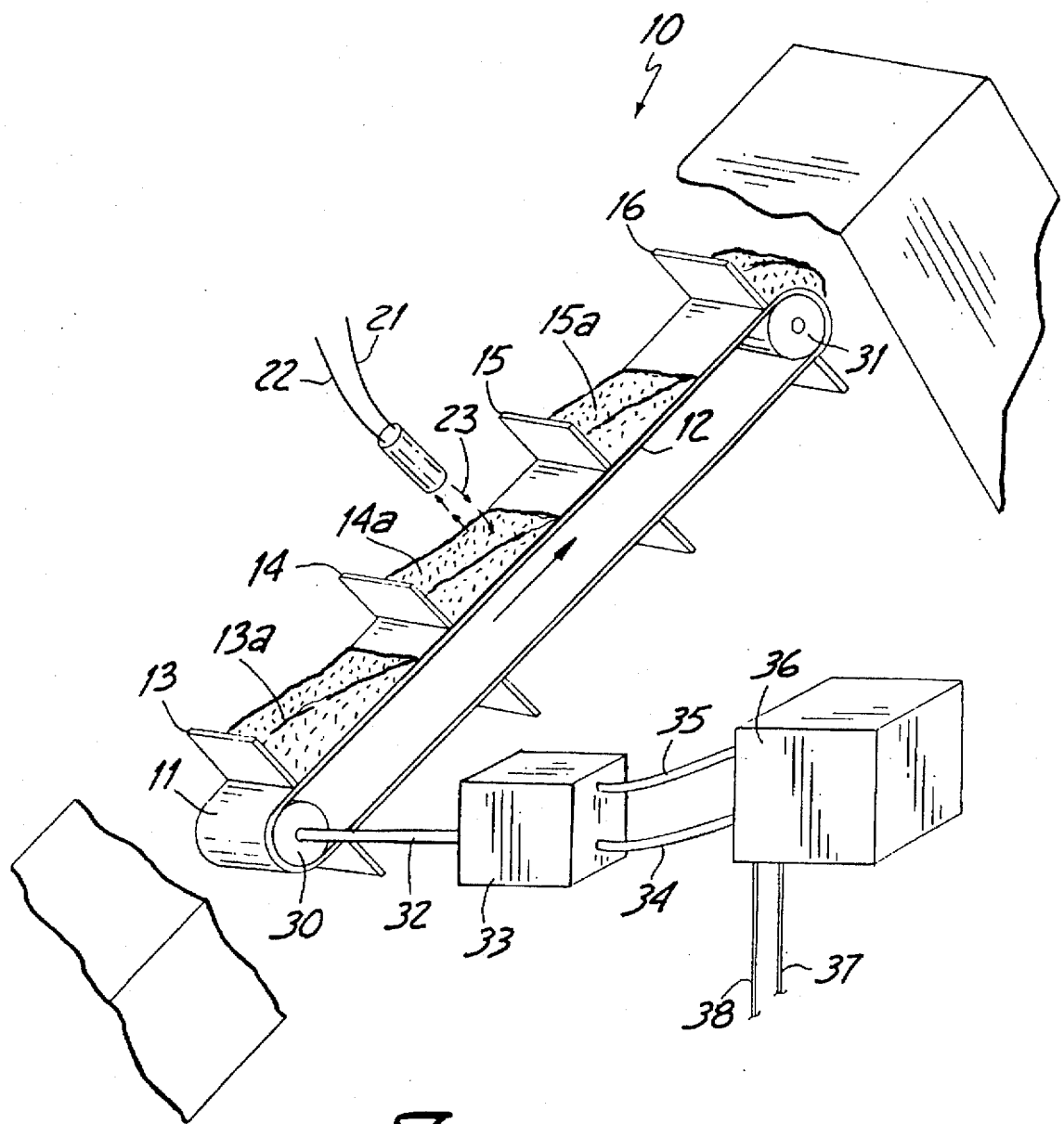
FIG. 1 shows a partial cut-away view of a chute on a harvesting apparatus.

FIG. 1 reference numeral 10 generally identifies a portion of a combine having a conveyor or elevator 11 located in housing 19. Conveyor 14 includes an endless belt 12 with paddles located in a uniformly spaced position thereon. Paddles 13, 14, 15 and 16 which are shown on the top side of conveyor 14 coact with sidewalls of conveyor housing 19 to define movable chambers therebetween which contain piles of harvested grain. That is, in front of paddle 13 is a pile of grain 13a and likewise in front of paddle 14 is a pile of grain 14a similarly in front of paddles 15 and 16 there are corresponding piles 15a and 16a. Conveyor belt 12 has one end supported by roller 31 and the other end supported by drive roller 30. A drive shaft 32 extends from a hydraulic motor 33 to drive roller 30. Connected to hydraulic motor 33 through hydraulic lines 34 and 35 is a source of hydraulic fluid from a system 36 containing a constant volume pump 36 and pressure gages for monitoring the pressure of the fluid supplied to hydraulic motor 33.

Figure 2:
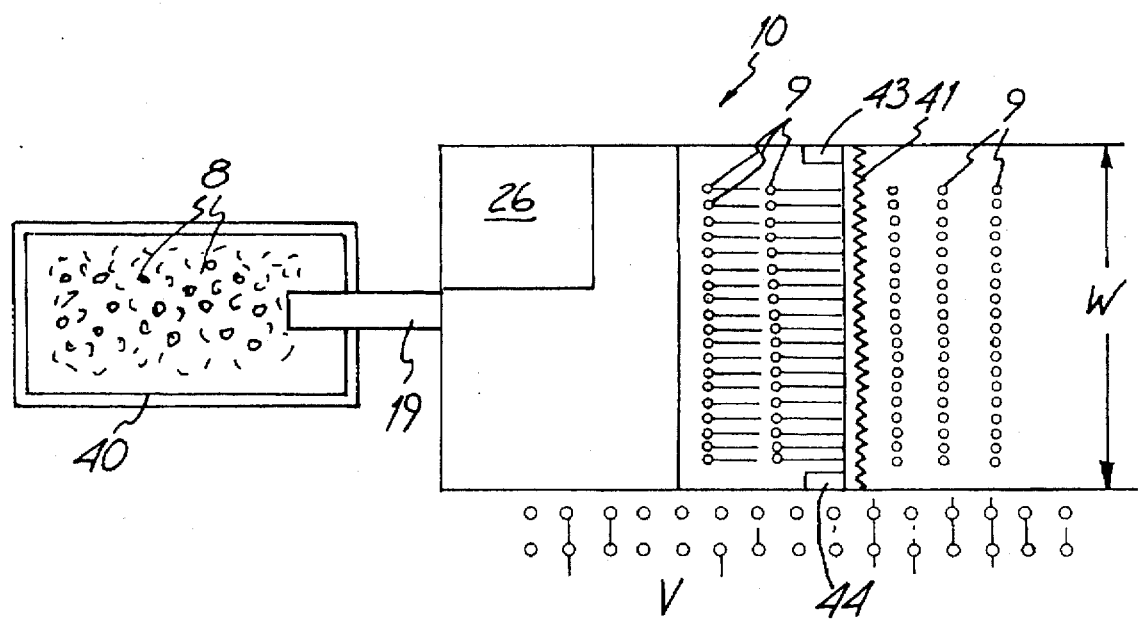
FIG. 2 shows a top view of a combine harvesting a standing crop.

FIG. 2 shows combine 10 with an onboard computer 26 for processing information to produce information on yield that can be displayed to the combine operator.

One feature of the invention is the ability to measure the weight of the harvested grain by determining the torque on the elevator drive shaft. In operation of the elevator the piles of harvested grain 13a, 14a, 15a and 16a, which comprise clean kernels that have been separated from the grain stalks, are elevated from a lower position to a higher position. Elevator 11 which is located in combine 10 elevates the grain from a first lower level proximate roller 30 to a second higher level proximate roller 31. If no grain is present on conveyor belt 12 a constant and reference amount of torque is required to rotate conveyor belt 12. When grain is placed on the conveyor belt it requires additional energy and greater torque on shaft 32 to continue to rotate endless conveyer belt 12. By measuring the increased torque on shaft 32 one can correlate the torque on shaft 32 to the weight of the grain on conveyor belt 12. In the present embodiment a hydraulic motor 33 is used to drive shaft 32 and the increase in fluid pressure needed to rotate elevator belt 12 can be correlated with the weight of grain on the conveyor belt. A signal represent is then sent via lines 37 and 38 to onboard computer 26. While a hydraulic motor is shown it is apparent other devices could be use for measuring the torque on shaft 32. For example, strain gages could be placed on shaft 32 to determine the increased strain as a result of lifting grain on elevator 11.

A further aspect of the invention is the measurement of volume of grain on conveyor belt 12. In order to measure the volume of the grain kernels being elevated on conveyor belt 12 there is provided an acoustic position sensor 23 that directs a signal to the grain that is received by the sensor to provide information regarding the height of the piles of grain 13a, 14a, 15a and 16a that pass under the acoustic position sensor 23. By obtaining the height of the piles of grain on the elevator the volume of grain can be determined because the sidewalls of housing 19 and the bottom of conveyor belt 12 are fixed. If the conveyor with no grain thereon is considered a base measurement then the measurement of the height of the grain on the conveyor by the acoustic sensor can be used to compute the volume since the width of the conveyor belt and the distance between paddles remains constant. In addition to determining the height of the grain the acoustic sensor indirectly determines the speed of the elevator. That is, the acoustic sensor output signals appears as peaks separated by valley like regions in between the peaks where the peaks represent the paddle passing under the acoustic sensor and the valleys between the peaks corresponding to the depth of the grain between the paddles. The faster the peaks appear in the output signal the faster the speed of the conveyor.

Acoustic position sensor 23 includes leads 21 and 22 for sending information to an onboard computer 26 on combine 10 (FIG. 2) where the information can be related to the actual volume of the harvested grain. Position sensor 23 can be mounted outside housing 19 if a suitable acoustic window is placed in housing 19. A typical and suitable material for an acoustic window is a material such as fiberglass.

Acoustic position sensors are known in the art and comprise an acoustic generator and receiver for measuring the time lapse between emission and reflection of an acoustic wave. That is, the farther away an object the longer it takes for the reflected signal to reach the position sensor.

With the information on both weight and volume of the crop being harvested one can determine the moisture content of harvested crop since the weight of the crop increases with higher moisture content. By further coupling the information with measurements of the crop area cut one can obtain on-the-go yield information.

FIG. 2 shows a typical system for determining the area of grain harvested. FIG. 2 shows a top view of combine 10 harvesting standing grain 9. Typically, a sickle 41 cuts the standing grain 9, and a conveyor belt directs the cut grain into the combine which separates the grain kernels from the grain stalk and the grain chaff. The grain kernels 8 are delivered to a hopper or bin 40. Means such as a pair of sensors 43 and 44 measure the width of the swath cut by sickle 41. The information on width is fed into computer 26 or, if desired, the information on the position of the harvesting unit can be obtained from a global positioning sensor mounted on harvesting unit 10. By inputting the position of the combine with the elapsed time between measurements, one obtains information on the size of the field cut during a particular interval. By dividing the yield of the crop in bushels by the acres which the harvesting unit has cut, one obtains the yield in bushels per acre.

An alternate approach is to use a ground speed sensor and determine the area harvested by multiplying the speed times the swath width to obtain the mount of grain cut during a particular interval.

It will be understood that the present invention provides information on both the weight and the volume of the harvested crop and by coupling the information with area measurements on can obtain an on-the-go yield monitor system to enable a farmer to determine the yield of crop 9 as the crop is being harvested by an implement 10. Typically, such devices are commercially available and are referred to as microwave doppler-shift devices.

We claim:

1. A method of measuring the yield of a standing crop comprised of stalk and kernels as the standing crop is harvested comprising:

cutting the standing crop and separating the kernels of grain from the stalk;

elevating the kernels of grain from a first level to a second level; and measuring the mount of energy to raise the kernels of grain from the first level to the second level and correlation of the amount of energy to raise the kernels of grain from the first level to the second level with a reference to determine the weight of the kernels of grain lifted from the first level to the second level.

2. The method of claim 1 including measuring the yield of the standing crop including directing an acoustic signal at the kernels of grain to determine the depth of the grain being elevated from the first level to the second level.

3. The method of claim 2 including;

determining information on the area of the standing crop cut; and processing the information on the area of the standing crop together with the information on the weight of the grain and the volume of the grain in an onboard processor on a combine to provide information to an operator on the weight and volume of the grain as the standing crop is being harvested.

4. The method of claim 3 including the step of elevating the kernels of grain in separate piles of grain.

5. The method of claim 2 including the processing the information on the weight and volume of the crop to determine the yield in bushels per acre.

* * * * *